United States Patent
Watanabe et al.

(10) Patent No.: US 10,349,794 B2
(45) Date of Patent: Jul. 16, 2019

(54) AUTONOMOUS TRAVELING BODY

(71) Applicant: TOSHIBA LIFESTYLE PRODUCTS & SERVICES CORPORATION, Kawasaki-shi (JP)

(72) Inventors: Kota Watanabe, Seto (JP); Hirokazu Izawa, Aisai (JP); Kazuhiro Furuta, Seto (JP); Yuuki Marutani, Nagakute (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 167 days.

(21) Appl. No.: 15/503,506

(22) PCT Filed: Aug. 21, 2015

(86) PCT No.: PCT/JP2015/073526
§ 371 (c)(1),
(2) Date: Feb. 13, 2017

(87) PCT Pub. No.: WO2016/031710
PCT Pub. Date: Mar. 3, 2016

(65) Prior Publication Data
US 2017/0231446 A1    Aug. 17, 2017

(30) Foreign Application Priority Data
Aug. 29, 2014 (JP) ................. 2014-176428

(51) Int. Cl.
*A47L 9/00* (2006.01)
*A47L 9/28* (2006.01)
(Continued)

(52) U.S. Cl.
CPC ............. *A47L 9/009* (2013.01); *A47L 9/00* (2013.01); *A47L 9/28* (2013.01); *A47L 9/2873* (2013.01);
(Continued)

(58) Field of Classification Search
CPC ... A47L 9/009; A47L 9/00; A47L 9/28; A47L 9/2873; A47L 2201/022; A47L 2201/04; G05D 1/02; G08B 25/00; H04N 5/2257
See application file for complete search history.

(56) References Cited

U.S. PATENT DOCUMENTS

| 8,843,245 B2 | 9/2014 | Choe et al. |
| 2005/0251457 A1 | 11/2005 | Kashiwagi |
| 2006/0196003 A1* | 9/2006 | Song .................... G05D 1/0259 15/319 |
| 2008/0082208 A1* | 4/2008 | Hong ................... G05D 1/0033 700/245 |

(Continued)

FOREIGN PATENT DOCUMENTS

| CN | 1354073 A | 6/2002 |
| CN | 201905823 U | 7/2011 |

(Continued)

OTHER PUBLICATIONS

International Search Report dated Sep. 15, 2015, in PCT/JP2015/073526, filed Aug. 21, 2015.

*Primary Examiner* — Robert J Scruggs
(74) *Attorney, Agent, or Firm* — Oblon, McClelland, Maier & Neustadt, L.L.P.

(57) ABSTRACT

A vacuum cleaner main body capable of picking up images over a wide range by a camera securely without being interrupted by any obstacles. The vacuum cleaner main body includes a main casing, a camera capable of picking up images and provided in the main casing, driving wheels for enabling the main casing to travel, a sensor part provided in the main casing to detect a distance to an obstacle around the main casing, and a control unit. The control unit has at least a traveling mode and an image pickup mode. In the image (Continued)

pickup mode, the control unit makes the main casing autonomously travel to an image pickup position where no obstacles within a certain distance around the main casing are detected by the sensor part and where still images in a plurality of directions are picked up.

5 Claims, 6 Drawing Sheets (51) Int. Cl.
  *G05D 1/02*  (2006.01)
  *G08B 25/00*  (2006.01)
  *H04N 5/225*  (2006.01)
(52) U.S. Cl.
  CPC ............... *G05D 1/02* (2013.01); *G08B 25/00* (2013.01); *H04N 5/2257* (2013.01); *A47L 2201/022* (2013.01); *A47L 2201/04* (2013.01)

(56) References Cited

U.S. PATENT DOCUMENTS

| | | | |
|---|---|---|---|
| 2010/0228394 A1* | 9/2010 | Yi | ........................ G05D 1/0246 |
| | | | 700/253 |
| 2011/0264305 A1 | 10/2011 | Choe et al. | |
| 2016/0309974 A1 | 10/2016 | Abe et al. | |

FOREIGN PATENT DOCUMENTS

| | | |
|---|---|---|
| CN | 103439973 A | 12/2013 |
| CN | 103458755 A | 12/2013 |
| EP | 3 133 458 A1 | 2/2017 |
| GB | 2 369 511 A | 5/2002 |
| JP | 2011-233149 A | 11/2011 |
| JP | 2013-235351 A | 11/2013 |
| JP | 2014-154010 A | 8/2014 |
| WO | 2015/087697 A1 | 6/2015 |

\* cited by examiner (a)

AUTONOMOUS TRAVELING BODY

CROSS-REFERENCE TO RELATED APPLICATIONS

The present application is a National Stage Application of PCT/JP2015/073526 filed on Aug. 21, 2015. The PCT application acclaims priority to Japanese Patent Application No. 2014-176428 filed on Aug. 29, 2014. All of the above applications are herein incorporated by reference.

TECHNICAL FIELD

Embodiments described herein relate generally to an autonomous traveling body including image pickup means capable of picking up a subject image.

BACKGROUND

Conventionally, there is known a so-called autonomous traveling type vacuum cleaner (cleaning robot) which cleans a floor surface as a cleaning-object surface while autonomously traveling on the floor surface and while detecting obstacles or the like by using a sensor or the like as an example.

In recent years, there has been developed a system in which such a vacuum cleaner as described above is used to make it possible to monitor and check an aspect of a user's home during the user's absence (e.g., whether a window is left open, whether an electric light remains on, etc.) or an aspect of a pet or the like, where the vacuum cleaner is enabled to automatically pick up images of indoor aspects by a camera upon an instruction from a mobile terminal.

In such a system, it is preferable that a wide-range image pickup be enabled without being interrupted by obstacles or the like in terms of indoor monitoring and checking.

CITATION LIST

Patent Literature

PTL 1: Japanese Laid-open Patent Publication No. 2011-233149
PTL 2: Japanese Laid-open Patent Publication No. 2013-235351

Technical Problem

An object of the present invention is to provide an autonomous traveling body capable of securely picking up images over a wide range by image pickup means without being interrupted by obstacles.

Solution to Problem

An autonomous traveling body in an embodiment of includes a main casing, a camera capable of picking up images and provided in the main casing, driving wheels for enabling the main casing to travel, a distance measuring sensor provided in the main casing to detect a distance to an obstacle around the main casing, and a control unit. The control unit has at least a traveling mode and an image pickup mode. In the traveling mode, the control unit controls drive of the driving wheels so as to make the main casing autonomously travel. In the image pickup mode, the control unit makes the main casing autonomously travel to an image pickup position where no obstacles within a certain distance around the main casing are detected by the distance measuring sensor and where still images in a plurality of directions are picked up.

BRIEF DESCRIPTION OF DRAWINGS

FIGS. 1A and 1B show an autonomous traveling body according to a first embodiment, where

DETAILED DESCRIPTION

Hereinbelow, a first embodiment will be described in terms of its constitution with reference to FIGS. 1A and 1B to 5.

In FIGS. 1A and 1B to 4, reference sign 10 denotes a vacuum cleaning device as a traveling body device. This vacuum cleaning device 10 includes a vacuum cleaner main body 11 as an autonomous traveling body, and a charging device (charging stand) 12 serving as a base station for charging of the vacuum cleaner main body 11. The vacuum cleaner main body 11 is enabled to fulfill wireless communication with an external device 16 such as a mobile phone via a (external) network 15 such as the Internet, for example, by performing communications (transmission and reception) with an access point 14 as relay means (relay part) such as a home gateway (router) installed in a room R or the like, which is a cleaning region, for example, by using wireless communication such as Wi-Fi (registered trademark) or Bluetooth (registered trademark).

The vacuum cleaner main body 11, in this embodiment, is a so-called self-propelled robot cleaner which cleans a floor surface as a cleaning-object surface while autonomously traveling (being self-propelled to travel) on the floor surface. The vacuum cleaner main body 11 includes, as its traveling-and-cleaning parts, a hollow main casing 20, an electric blower 21 as an operating part (cleaning part) housed in the main casing 20, a dust collecting unit 22 communicating with a suction side of the electric blower 21, driving wheels 23, 23 as a plurality (pair) of driving parts for traveling use as an example, motors 24, 24 being driving means (drive members) as operating parts for driving the driving wheels 23, 23, a swing wheel 25 for swinging use, side brushes 26, 26 being auxiliary cleaning means (auxiliary cleaning parts), e.g., as a plurality (pair) of swinging cleaning parts (cleaning parts) placed in a lower part of the main casing 20 so as to be swingable along a floor surface, side brush motors 27, 27 being swing driving means (swing drive members) as operating parts (cleaning parts) for swinging the side brushes 26, 26, a rotary brush 28 being cleaning means (cleaning member) as a rotary cleaner (cleaning part) placed in a lower part of the main casing 20 so as to be rotatable, a brush motor 29 being rotation driving means (rotation drive member) as an operating part (cleaning part) for rotationally driving the rotary brush 28, and the like. The vacuum cleaner main body 11 also includes, as input/output-and-control parts, sensor parts 31 as operating parts having various types of sensors, a display part 34 as display means, a camera 35 as image pickup means (image pickup part), a wireless LAN device being wireless communication means (wireless communication part), a control unit (controller) 37 as control means composed of a circuit board or the like, and the like. Further, the vacuum cleaner main body 11 has, inside the main casing 20, a secondary battery 39 for supplying electric power to the above-described individual parts. In addition, the following description will be given on the assumption that a direction extending along the traveling direction of the vacuum cleaner main body 11 (main casing 20) is assumed as a back-and-forth direction (directions of arrows FR and RR shown in FIG. 3, etc.) while a left-and-right direction (directions toward both sides) intersecting (orthogonally crossing) the back-and-forth direction is assumed as a widthwise direction.

The main casing 20 is formed into a flat columnar shape (disc shape) or the like from a synthetic resin as an example. A widthwise-longitudinal, i.e., long sideways suction port 41 is opened at a rear-sided position in a central portion in the widthwise direction of a circular-shaped lower surface of the main casing 20, and moreover a plurality of exhaust ports 42 are opened forward of the suction port 41. Also, the camera 35 is placed on this main casing 20.

The suction port 41 communicates with the suction side of the electric blower 21 via the dust collecting unit 22. Further, in this suction port 41, the rotary brush 28 is placed so as to be rotatable.

The exhaust ports 42 each communicate with the exhaust side of the electric blower 21 via the dust collecting unit 22.

The electric blower 21, when driven, generates a negative pressure to suck dust and dirt through the suction port 41 to the dust collecting unit 22. The electric blower 21 is housed inside the main casing 20, for example, with its suction side facing rearward and with its axial direction extending along the back-and-forth direction (horizontal direction). In addition, this electric blower 21 may become unnecessary in the case of a configuration in which dust and dirt are scraped up to the dust collecting unit 22 by the rotary brush 28 or the like as an example. Therefore, the electric blower 21 is not an indispensable configuration.

The dust collecting unit 22 is intended to collect dust and dirt sucked through the suction port 41 by the drive of the electric blower 21.

Each of the driving wheels 23 makes the vacuum cleaner main body 11 (main casing 20) travel (autonomously travel) in the advancing direction and the retreating direction on the floor surface, i.e., are for traveling use. The driving wheels 23, each having a rotational axis unshown in the drawings extending along a left-and-right widthwise direction, are placed symmetrical to each other in the widthwise direction.

Each of the motors 24 is placed in correspondence to each of the driving wheels 23, respectively, for example, and is enabled to drive each of the driving wheels 23 independently of each other.

The swing wheel 25, which is positioned at a generally central and front portion in the widthwise direction of the main casing 20, is a driven wheel swingable along a floor surface.

Each of the side brushes 26 has brush bristles 43 as a plurality (e.g., 3) of cleaner members radially protruding to come into contact with the floor surface. The side brushes 26, 26 are placed at both-side positions forward of the driving wheels 23, 23 and rearward of the swing wheel 25 in the main casing 20.

Each of the side brush motors 27 is enabled to rotate each of the side brushes 26 toward the center side in the widthwise direction of the main casing 20, in other words, rotate the right-side side brush 26 toward the left side and the left-side side brush 26 toward the right side so that forward-located (in the advancing direction) dust and dirt is scraped together toward the suction port 41 side by each of the side brushes 26.

In addition, these side brushes 26 and the side brush motors 27 are not indispensable configurations on the condition that enough cleaning can be fulfilled by the electric blower 21 or the rotary brush 28.

The rotary brush 28 is formed into an elongated shape and its both-end portions are rotatably and pivotally supported by widthwise both-end portions of the suction port 41. The rotary brush 28 is protruded from the suction port 41 downward of the lower surface of the main casing 20 such that, with the vacuum cleaner main body 11 laid on the floor surface, the rotary brush 28 has a lower portion in contact with the floor surface so as to scrape off dust and dirt.

The brush motor 29 is housed inside the main casing and connected to the rotary brush 28 via an unshown gear mechanism as a mechanism part.

In addition, these rotary brush 28 and brush motor 29 are not indispensable configurations on the condition that enough cleaning can be fulfilled by the electric blower 21 or the side brushes 26, 26.

The sensor parts 31 have the functions of: rotational speed detection means (rotational speed sensor) such as an optical encoder for measuring a rotational speed of the motor 24 as an example; obstacle detection means (obstacle sensor) which is distance measuring means (distance measuring sensor) such as an ultrasonic sensor or an infrared sensor, as an example, for detecting an obstacle by detecting a distance to an obstacle such as a wall or furniture; step gap detection means (step gap sensor) such as an infrared sensor for detecting a step gap of a floor surface or the like; and the like. These sensor parts 31 are placed at various portions such as an upper portion, outer-peripheral portions (front portion and rear portion), a lower portion, and the like of the main casing 20.

The display part 34, which displays time of day or time elapse or various types of information related to the vacuum cleaner main body 11, is placed at an upper portion of the main casing 20 as an example. This display part 34 may be, for example, a touch panel or the like also serving as input operation means (input operation part) which allows a user to directly input various settings.

The camera 35 includes a camera module as image-pickup-means main body (image-pickup-part main body) for image pickup use, and an illuminating device such as an LED which is lit by the control unit 37 in image pickup. This camera 35 is placed, for example, at an outer-peripheral portion or upper portion or the like of the main casing 20 in a front, left-right direction central part of the main casing 20. The camera 35 is capable of picking up a still image in a direction extending along a radial direction on a center axis of the main casing 20 and inclined upward; in this embodiment, a still image of a region ranging from forward to forward-upper portions at a specified horizontal angle of view (e.g., 105° or the like) and moreover, is capable of outputting digitized data of the picked-up still images to the control unit 37. Therefore, the camera 35 is placed at a position separate from a swinging center (center axis) of the main casing 20.

The wireless LAN device 36 is intended to fulfill wireless communication with an external device via the access point 14 and the network 15. Therefore, it is possible via the wireless LAN device 36 to receive various types of information from the network 15 or input various types of information from the external device 16. That is, the wireless LAN device 36 has functions as external signal reception means (external signal reception part) for receiving an external signal transmitted from the external device 16 via the network from the access point 14, and as signal reception means (signal reception part).

The control unit 37 includes a CPU which is control means main body (control unit main body), a ROM which is a storage section in which fixed data such as programs to be read out by the CPU have been stored, a RAM which is an area storage section for dynamically forming various memory areas such as a work area serving as a working region for data processing by programs, a memory which is storage means (storage part) such as an SDRAM for storing therein image data picked up by the camera 35 as an example, a timer for clocking calendar information such as current day and time, and the like. The control unit is electrically connected to the electric blower 21, each motor 24, each side brush motor 27, the brush motor 29, the sensor parts 31, the display part 34, the camera 35, the wireless LAN device 36, and the like. Further, the control unit 37 has a cleaning mode which is a traveling mode for, while executing autonomous travel, controlling the drive of the electric blower 21, each motor 24, each side brush motor 27, the brush motor 29, and the like based on detection results of the sensor parts 31; a charging mode for charging the secondary battery 39 via the charging device 12; an image pickup mode for performing image pickup by the camera 35; and a standby mode applied during a standby state.

The secondary battery 39 supplies electric power to the electric blower 21, each motor 24, each side brush motor 27, the brush motor 29, the sensor parts 31, the camera 35, the wireless LAN device 36, the control unit 37, and the like. The secondary battery 39 is electrically connected to charging terminals 45 exposed on both sides in a rear part of the lower surface of the main casing 20 as an example.

Meanwhile, the charging device 12 is placed at a position non-obstructive of cleaning such as a vicinity of a wall portion W that defines a room R. In this charging device 12, a charging circuit 52 such as a constant current circuit for use of charging of the secondary battery 39 is housed in a charging device casing 51, and terminals for charging 53, 53 electrically connected to the charging circuit 52, as well as an electric power cord 54 for electric power supply use connected to a commercial electric power source, or the like is exposed outside the charging device casing 51. Operation of the charging circuit 52 is controlled by a charging device control unit (charging device controller) 58 as charging device control means. Then, the charging device control unit 58 has a charging mode for charging the secondary battery 39 via the charging circuit 52, and a standby mode applied during a standby state.

Next, operations of the above-described first embodiment will be described.

Generally, the autonomous traveling type vacuum cleaner main body 11 performs, as roughly classified, cleaning work in which the vacuum cleaner main body 11 cleans, and charging work in which the charging device 12 charges the secondary battery 39. In this embodiment, in addition to these kinds of work, the vacuum cleaner main body 11 performs image pickup work in which still images of an aspect in the room R and the like are picked up.

(Cleaning Work)

In the vacuum cleaner main body 11, for example, at a cleaning-start timing such as coming to a preset cleaning start time, the control unit 37 is switched over from standby mode to cleaning mode to drive the electric blower 21, the driving wheels 23, 23 (motors 24, 24), the side brushes 26, 26 (side brush motors 27, 27), the rotary brush 28 (brush motor 29) and the like, so that the vacuum cleaner main body 11 is undocked from the charging device 12 as an example to start cleaning while autonomously traveling on the floor surface by means of the driving wheels 23, 23. In addition, the start position for cleaning may be set to any arbitrary place such as a traveling start position of the vacuum cleaner main body 11 or an entrance of the room R, or the like.

During the traveling, the control unit 37 monitors a traveling state of the vacuum cleaner main body 11 (main casing 20) by detecting, for example, distances to a wall portion W surrounding the room R, an obstacle within the room R, and the like, as well as a step gap of the floor surface or the like via the sensor parts 31. In response to detection by the sensor parts 31, the control unit 37 drives the driving wheels 23, 23 (motors 24, 24) so that the vacuum cleaner main body 11 is traveled, for example, randomly or along a wall portion on the floor surface while avoiding any obstacles, step gaps, and the like.

Then, the vacuum cleaner main body 11 scrapes together dust and dirt to the suction port 41 by the side brushes 26, 26 that are driven to swing. The dust and dirt on the floor surface is sucked in along with air by the suction port 41 on which a negative pressure generated by the drive of the electric blower 21 has acted via the dust collecting unit 22. Also, the rotary brush 28 that is driven to rotate scrapes off dust and dirt on the floor surface to the dust collecting unit 22.

The dust and dirt sucked along with air through the suction port 41 is isolated and collected into the dust collecting unit 22. Air from which the dust and dirt have been isolated is sucked into the electric blower 21, cooling the electric blower 21 and thereafter becoming exhaust air, which is discharged outside the main casing 20 through the exhaust ports 42.

Under a specified condition that the cleaning of a cleaning region has been completed or the capacity of the secondary battery 39 has lowered to such a specified level as to be insufficient for the completion of the cleaning (the voltage of the secondary battery 39 has lowered to near its discharge final voltage) or the like, the vacuum cleaner main body 11 makes the control unit 37 drive the driving wheels 23, 23 (motors 24, 24) to thereby return to the charging device 12. In addition, for this return, the vacuum cleaner main body 11 may be made to approach the charging device 12, for example, based on a guide signal outputted from the charging device 12 or may be returned to the position of the charging device 12 according to a map of the room R preparatorily stored in the control unit 37. Then, in the state that the vacuum cleaner main body 11 has been moved (returned) to the charging device 12, the charging terminals 45 are (mechanically and electrically) docked with the terminals for charging 53, where the individual parts are stopped, ending the cleaning work.

(Charging Work)

After docking of the vacuum cleaner main body 11 with the charging device 12, for example, when a specified timing, e.g. a previously set charging start time, has come or when a specified time has elapsed since the docking of the vacuum cleaner main body 11 with the charging device 12, the control unit 37 and the charging device control unit 58 each shift to the charging mode to drive the charging circuit 52, starting the charging of the secondary battery 39. Then, if it is decided that the voltage of the secondary battery 39 has increased to a specified operable voltage, then the control unit 37 and the charging device control unit 58 stop the charging by the charging circuit 52 to end the charging work, where the control unit 37 and the charging device control unit 58 each shift to the standby mode.

(Image Pickup Work)

In an outline, the vacuum cleaner main body 11, upon receiving an image pickup instruction from the external device 16, is switched over from the cleaning mode, the charging mode or the standby mode to the image pickup mode in a case where the remaining capacity of the secondary battery 39 is an image pickup-enabled capacity. In the image pickup mode, a plurality of directions are picked up by the camera 35 as image pickup positions which are separated by a specified distance or more from any obstacle around the main casing 20. In this image pickup, in this embodiment, the image pick up is carried out while the main casing 20 is swung.

Figure 1:
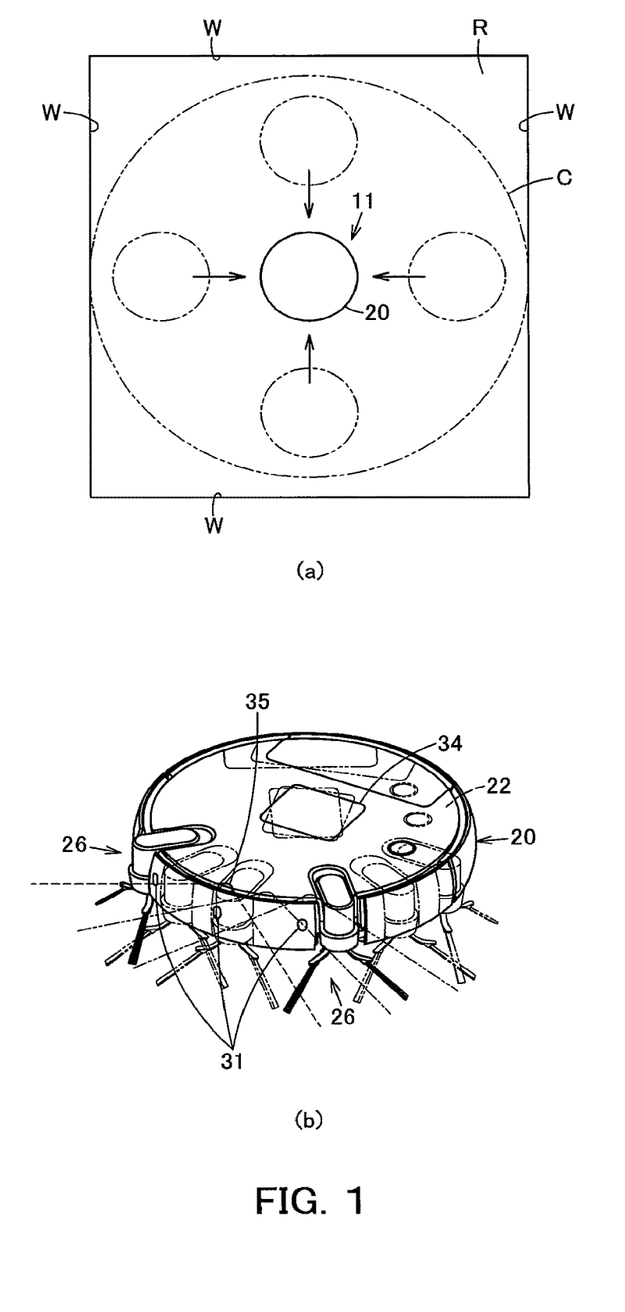
FIG. 1A is a plan view schematically showing a method for moving to an image pickup position.
FIG. 1B is a perspective view showing an action in image pickup.
Figure 2:
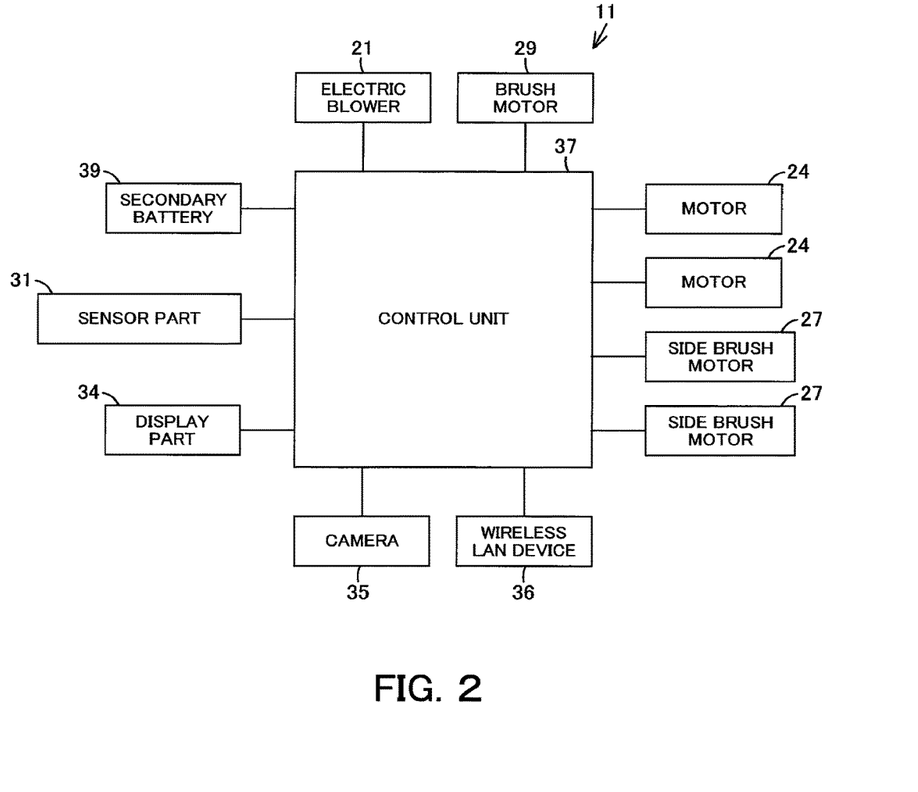
FIG. 2 is a block diagram showing an internal structure of the same autonomous traveling body.
Figure 3:
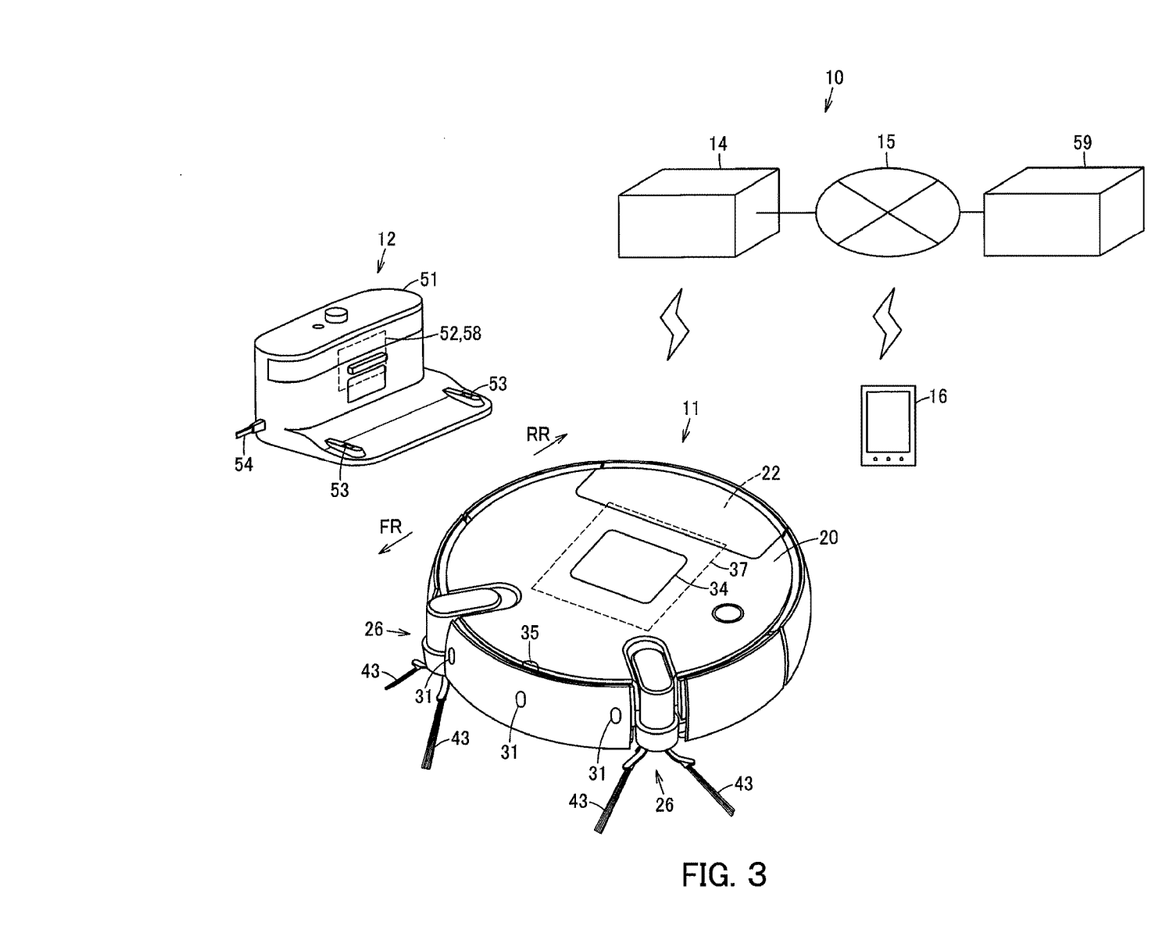
FIG. 3 is an explanatory view schematically showing a system including the same autonomous traveling body.
Figure 4:
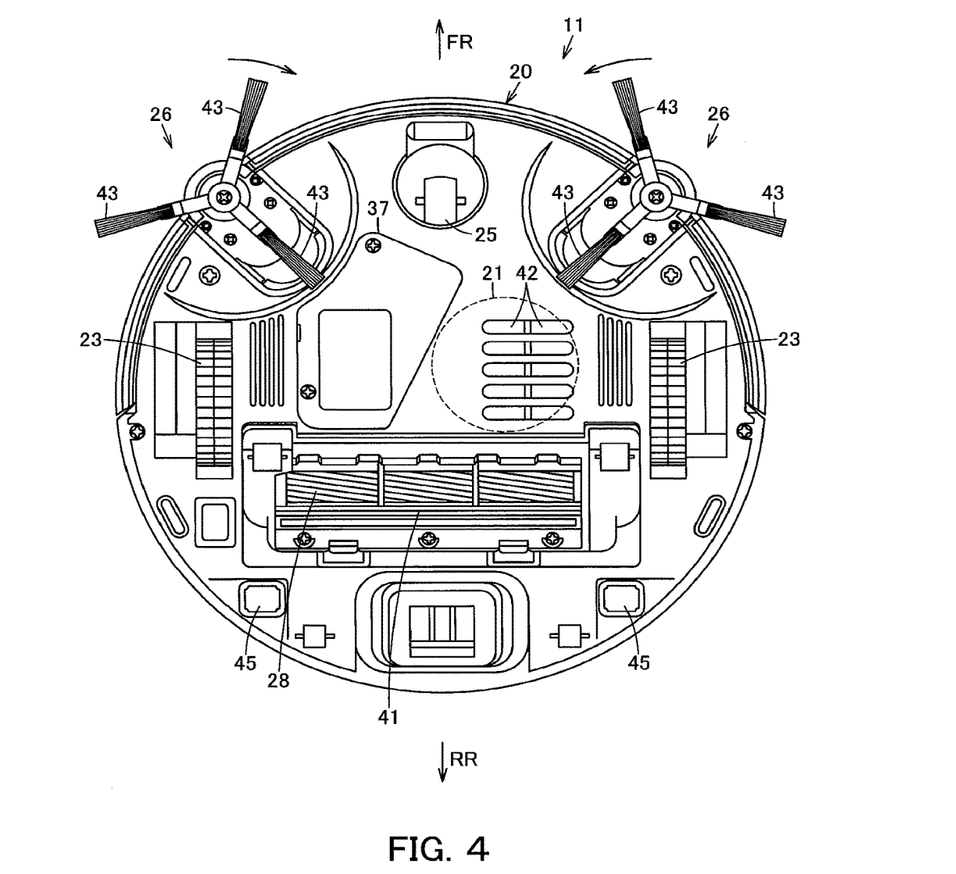
FIG. 4 is a plan view showing the autonomous traveling body as viewed from below.
Figure 5:
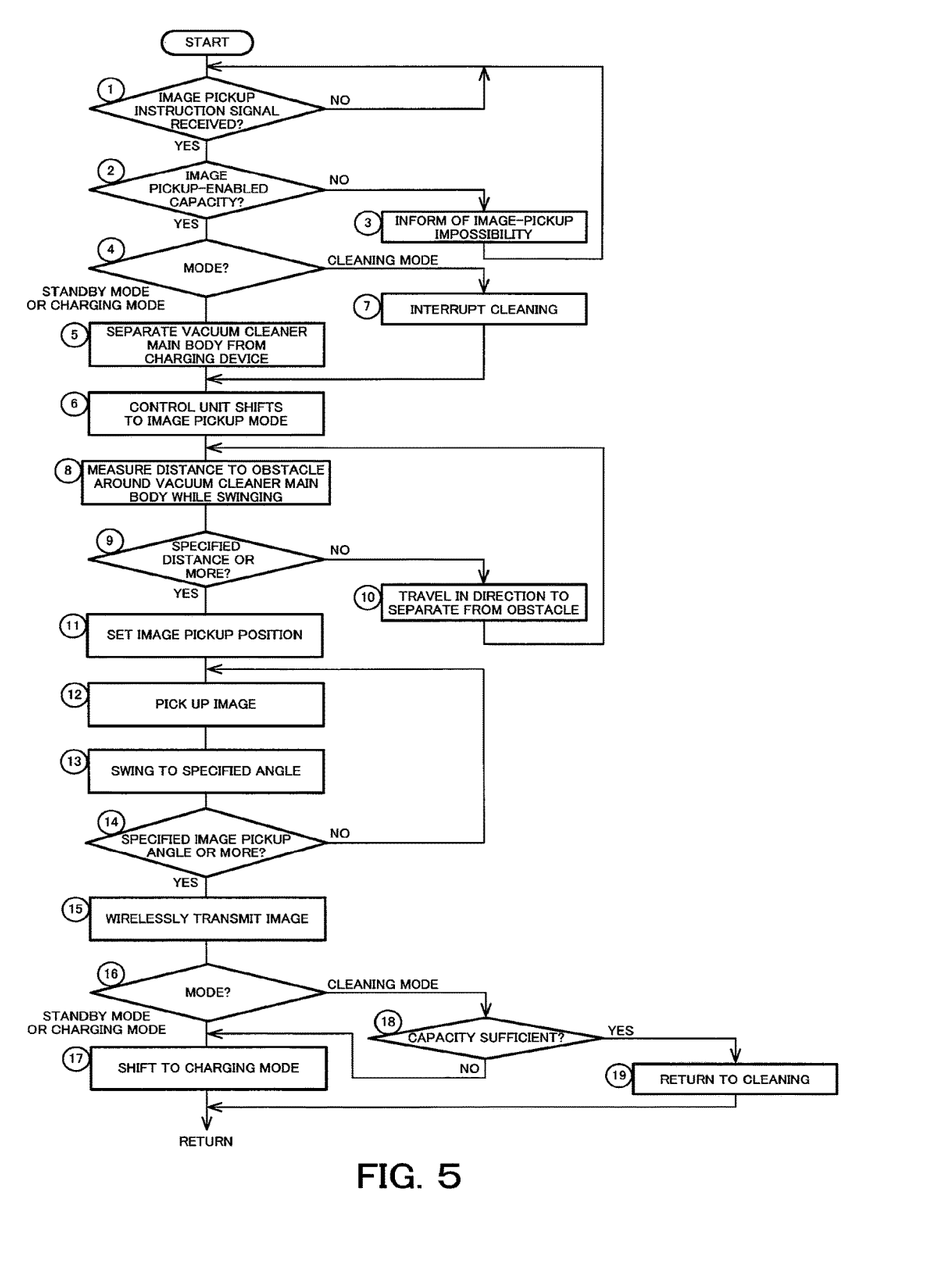
FIG. 5 is a flowchart showing control in an image pickup mode of the autonomous traveling body.

More specifically, with reference to the flowchart shown in FIG. 5, the control unit 37 decides, in real time or every specified time elapse as an example, whether or not an image pickup instruction signal as an external signal for instructing image pickup by the camera 35 transmitted from the external device 16 via the network 15 has been received via the access point 14 by the wireless LAN device 36 (step 1). In addition, for wireless communication between the external device 16 and the vacuum cleaner main body 11, it is preferable to set an ID, password or the like for every external device 16 and every vacuum cleaner main body 11 and request authentication at the time of connection so as to prohibit reception of invalid signals.

In this step 1, if it is decided that an image pickup instruction signal, being an external signal for instructing image pickup by the camera 35, transmitted from the external device 16 via the network 15, has been received by the wireless LAN device 36, then the control unit 37 first detects a remaining capacity of the secondary battery 39, regardless of which is the current mode, to decide whether or not the remaining capacity of the secondary battery 39 is an image pickup-enabled capacity that enables image pickup by the camera 35 (step 2). In addition, the term 'image pickup-enabled capacity' hereinafter refers to such a capacity by which, for example, the main casing 20 (vacuum cleaner main body 11) is enabled to travel to a specified distance or more and moreover, image pickup by the camera 35 as well as transmission of picked-up image data from the network 15 via the wireless LAN device 36 to the external device 16 are enabled.

Then, if it is decided at step 2 that the remaining capacity of the secondary battery 39 is not an image pickup-enabled capacity, then the control unit 37 informs the external device 16, for example, of the image-pickup impossibility by using the wireless LAN device 36 (step 3), returning to step 1 with the image pickup instruction signal disregarded.

On the other hand, if it is decided at step 2 that the remaining capacity of the secondary battery 39 is an image pickup-enabled capacity or more, then the control unit 37 (and charging device control unit 58) decides the mode (step 4).

If the mode is decided as the charging mode or the standby mode at step 4, the control unit 37 drives the driving wheels 23, 23 (motors 24, 24) to separate the vacuum cleaner main body 11 from the charging device 12 (step 5), and shifts to the image pickup mode (step 6).

On the other hand, if the mode is decided as the cleaning mode at step 4, the control unit 37 stops, for example, the drive of the electric blower 21, the side brushes 26, 26 (side brush motors 27, 27) and the rotary brush 28 (brush motor 29) to interrupt the cleaning (step 7), proceeding to step 6 to shift to the image pickup mode.

Then, in the image pickup mode of step 6, the vacuum cleaner main body 11 first makes the driving wheels 23, 23 (motors 24, 24) driven by the control unit 37 to swing the main casing 20 and a distance between the main casing 20 and an obstacle such as a wall portion W around the main casing 20 is measured by the function of the obstacle sensor (distance measuring sensor) of the sensor parts 31 (step 8). Then, the control unit 37 decides whether or not the measured distance is a certain specified distance or more, e.g. 2 m or more, (step 9). That is, in the image pickup mode, a distance to be referenced for deciding a distance to an obstacle by the function of the obstacle sensor (distance measuring sensor) of the sensor parts 31 in order to ensure a desired image pickup distance for the camera 35, differing from the distance in the cleaning mode, is set larger than that of the cleaning mode. In this connection, although it is assumed that the main casing 20 swings to 360°, as an example in this embodiment, in step 8 the swing angle may also be set to a specified angle less than 360° in response to a range of image pickup by the camera 35 or the like. In addition, the swing of the main casing 20 (vacuum cleaner main body 11) hereinafter refers to a so-called spin turn, which means a swinging of the main casing 20 about a center that is the center axis of the main casing 20, while the main casing 20 holds its position as it is, the spin turn being accomplished by pivoting one driving wheel 23 (one motor 24) and the other driving wheel 23 (the other motor 24) in mutually opposite directions. However, without being limited to this, the swinging of the main casing 20 (vacuum cleaner main body 11) includes cases in which the main casing 20 (vacuum cleaner main body 11) travels circularly so as to swing with a specified radius around a specified swinging center as an example.

Then, at step 9, if it is decided that a distance between the main casing 20 and an obstacle around the main casing 20 is neither equal to nor more than a specified distance (2 m) (i.e., less than a specified distance (2 m)) as an example, then the control unit 37 drives the driving wheels 23, 23 (motors 24, 24) to make the main casing 20 travel in such a direction as to separate from the obstacle (wall portion W etc.) (step 10, FIG. 1(a)), returning to step 8. In addition, on the condition that the traveling distance in this case is set to, for example, a distance which is equal to or more than a difference between the specified distance used for the decision in step 9 and the distance from the main casing 20 to the obstacle, or which is the specified distance itself, so that the main casing 20 can be separated from the obstacle by the specified distance or more with reliability. Also, if it is decided at step 9 that the distance between the main casing 20 and an obstacle around the main casing 20 is a specified distance (2 m) or more, the main casing 20 (vacuum cleaner main body 11) decides as being located at a place where no wall portion W or the like is present within a vicinal specified distance, such as a central portion of the room R, followed by setting the current position as an image pickup position (step 11).

Thereafter, the control unit 37 performs image pickup by the camera 35 in that position (step 12), and then the control unit 37 drives the driving wheels 23, 23 (motors 24, 24) to make the main casing 20 swing to the left direction (or right direction) to a specified angle, which is exemplified by a specified angle equal to or less than the horizontal angle of view of the camera 35, preferably a specified angle not more than one half of the horizontal angle of view, e.g. 30° in this embodiment (step 13, FIG. 1B). Next, the control unit 37 decides whether or not the main casing 20 has swung, in the image pickup position, to a specified image pickup angle more than the angle of view of the camera 35, e.g. 360° or more (step 14), where if it is decided that the main casing 20 has not swung to a specified image pickup angle (360°) or more (has swung to an angle less than the specified image pickup angle (360°)), the control unit 37 returns to step 12. By execution of such control, the vacuum cleaner main body 11 is enabled to pick up still images in plural directions neighboring one another in units of an angle not more than the horizontal angle of view of the camera 35 in a quantity of such still images corresponding to a specified image pickup angle (e.g., 360°). Therefore, these still images include gradually overlapping portions between one image and another, where in this embodiment, one half or more of still images neighboring one another overlap with one another so that still images are picked up on the whole without dead angles over a specified image pickup angle.

Also, if it is decided at step 14 that the main casing 20 has swung to a specified image pickup angle (360°) or more, the control unit 37 temporarily stores a plurality of still images picked up and outputted by the camera 35 in memory after compressing them to a specified image format as an example, and moreover wirelessly transmits, from the wireless LAN device 36, those still images individually or panoramic images that have been subjected to image processing so that overlapping portions of neighboring still images are succeeded by one another (step 15). The wireless-transmitted image data are stored in a server 59 connected to the network 15, so that those images can be checked remotely via the external device 16 at any arbitrary timing.

Next, the control unit 37 decides which mode it is immediately before shifting to the image pickup mode (step 16). At this step 16, if it is decided that the mode has been the charging mode or the standby mode, then the control unit 37 makes the vacuum cleaner main body 11 return to the charging device 12, as in the case of the cleaning work, and then shifts to the charging mode along with the charging device control unit 58 (step 17).

On the other hand, if it is decided at step 16 that the mode has been the cleaning mode (i.e. that the cleaning mode has been interrupted and shifted to the image pickup mode), the control unit 37 decides whether or not the capacity of the secondary battery 39 is sufficient in comparison to a capacity required for the remaining cleaning (step 18). If it is decided that the capacity is sufficient, then the control unit 37 drives the electric blower 21, the side brushes 26, 26 (side brush motors 27, 27) and the rotary brush 28 (brush motor 29) so as to return to the cleaning (step 19); if it is decided that the capacity is insufficient, then the control unit 37 proceeds to step 17, where the control unit 37 makes the vacuum cleaner main body 11 return to the charging device 12, as in the case of the cleaning work, so as to shift to the charging mode. In addition, it is also allowable to exert such control that, regardless of which mode it has been immediately before shifting to the image pickup mode, an end of the image pickup mode is necessarily followed by shifting to the charging mode. In this case, an end of charging of the secondary battery 39 may be followed, as it is, for example, by shifting to the standby mode, or otherwise, after this charging, the control unit 37 may return to the cleaning only if the mode immediately before shifting to the image pickup mode is the cleaning mode.

As described above, according to this first embodiment, since the control unit 37 controls the drive of the driving wheels 23, 23 (motors 24, 24) to thereby make the main casing 20 swingable, the device can be constituted at a low cost without the need to provide large quantities of the cameras 35 or the sensor parts 31 that would lead to a complicated constitution. Still, since the vacuum cleaner main body 11 is so designed that the main casing 20 is always swingable to implement the autonomous traveling, this constitution can be effectively utilized as it is, eliminating the need to provide any additional configurations for making the main casing 20 swingable only for the image pickup mode.

In addition, although the main casing 20 is swung to swing the camera 35 in the above-described first embodiment, it is also allowable that the camera 35 is swingably attached to the main casing 20 so that the camera 35 alone is swung. In this case, the electric power consumption of the secondary battery 39 is reduced, as compared with the case in which the driving wheels 23, (motors 24, 24) are driven to make the main casing 20 travel, allowing the secondary battery 39 to be elongated in serve life.

When the swinging of the main casing 20 and the image pickup by the camera 35 are repeated, it is preferable that the main casing 20 is swung to a specified angle not more than the horizontal angle of view of the camera 35 and then stopped from swinging each time before the image pickup is executed because the image quality of still images can be improved this way. However, when the main casing 20 is swung at a considerably lower speed relative to the shutter speed of the camera 35, similar functional effects can be produced even when images are picked up in units of a specified angle while the main casing 20 is swinging.

Further, on the condition that the camera 35 picks up an image while facing a radially outward side relative to the center axis of the main casing 20, the camera 35 may be placed at a rear portion of the main casing 20 or the like.

Figure 6:
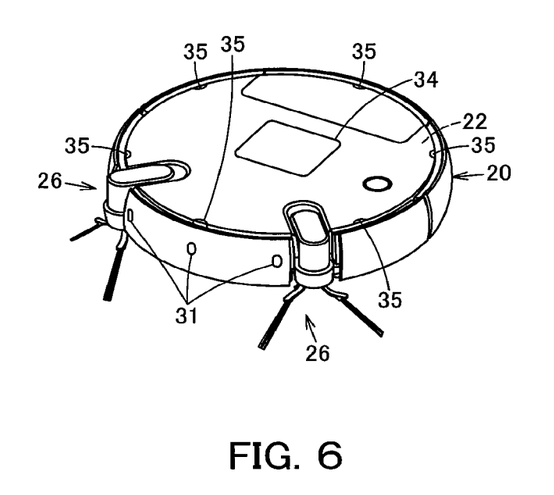
FIG. 6 is a perspective view showing an autonomous traveling body according to a second embodiment.

Meanwhile, in the above-described first embodiment, when a plurality of the cameras 35 are provided circumferentially in the main casing 20, for example, at angular intervals not more than the angle of view of the cameras 35 and moreover, a plurality of the sensor parts 31 are provided as in the case of the second embodiment shown in FIG. 6, the swinging for image pickup by the cameras 35 or detection by the sensor parts 31 (e.g., step 8 and steps 12 to 14 in the first embodiment) is no longer necessary, allowing the control to be further simplified.

In addition, in the foregoing individual embodiments, still images in a plurality of directions to be picked up by the camera 35 are picked up in units of a specified angle not more than the horizontal angle of view of the camera 35. However, unless significant dead angles occur between neighboring still images, image pickup may be done in units of a specified angle larger than the horizontal angle of view of the camera 35, in which case also a wide range of image pickup can be fulfilled by still images in a plurality of directions, allowing similar functional effects to be produced.

Also, the vacuum cleaner main body 11 may be equipped with, for example, infrared detection means (infrared sensor) such as a motion sensor, temperature detection means (temperature sensor) capable of detecting a temperature outside the main casing 20 (vacuum cleaner main body 11), sound detection means (voice sensor) such as a microphone capable of detecting a sound volume, a frequency and the like outside the main casing 20 (vacuum cleaner main body 11), illuminance detection means (illuminance sensor) capable of detecting an illuminance outside the main casing 20 (vacuum cleaner main body 11), gas detection means (gas sensor) capable of detecting toxic gases such as carbon monoxide outside the main casing 20 (vacuum cleaner main body 11), odor detection means (odor sensor) capable of detecting an odor outside the main casing 20 (vacuum cleaner main body 11), and the like. With such equipment, the vacuum cleaner main body 11 may be set so as to shift to the image pickup mode based on detection by those sensors. That is, a trigger for shifting to the image pickup mode may be set arbitrarily.

With use of an infrared sensor, for example, when an intruder such as a sneak thief is detected, the infrared sensor in combination with image pickup by the camera 35 can be used for in-home crime prevention. Moreover, the infrared sensor with the image pickup helps watch over a pet or a child during the absence of people. In addition, upon detection of forgetting to switch off fire sources such as a heater or eruption of a fire, for example, picking up an image by the camera 35 allows the user to be informed of the event.

Similarly, with use of a temperature sensor, for example, when a high temperature of 32° C. or more is detected, picking up images by the camera 35 can be used for in-home crime prevention, information of a fire, and the like.

Further, with use of a voice sensor, when an abnormal sound such as a glass-cracking sound or object-falling sound or a loud sound (e.g., 60 dB or more) is detected, picking up images by the camera 35 can be used for in-home crime prevention. Moreover, for example, even when a user or other persons are present in the room R, it is also possible to detect communications among family members and pick up images by the camera 35.

Also, with use of an illuminance sensor, for example, when an abrupt illuminance change (e.g., a change of 100 lx or more) in the room R is detected, picking up images by the camera 35 makes it possible to not only inform a user of emergencies such as a fire but also to confirm return to home of other family members or the like by lighting of a room R's light.

Further, with use of a gas sensor or an odor sensor, for example, when carbon monoxide or its odor is detected, picking up images by the camera 35 makes it possible to inform a user of an in-home abnormality.

Also, when an image pickup instruction signal is received during charging work of the secondary battery 39, it is allowable that a standby state is kept until the secondary battery 39 is charged up to a specified capacity (e.g., a full charge or the like) and, after completion of the charging, shifting to the image pickup mode is executed.

Although the function of an autonomous traveling body is provided to the vacuum cleaner main body 11 in the above cases, the utility as an autonomous traveling body may be dedicated to simply picking up images by using the camera 35 or other applications without being limited to those having the cleaning function.

Furthermore, at an interruption of communications between the network 15 and the wireless LAN device 36, for example, when the vacuum cleaner main body 11 has come to a dead angle of communications with the network (access point 14) during the image pickup mode, the vacuum cleaner main body 11 may be stopped at the interrupting position or stopped after being autonomously traveled to a specified position.

Since wireless communication using the wireless LAN device 36 involves electric power consumption, it is preferable to suppress communication with the wireless LAN device 36 in a state of using the electric power of the secondary battery 39, i.e., during cleaning or the like. Accordingly, when an image pickup instruction signal is received during the cleaning mode, it is possible to inform the user of a currently under-way cleaning state via the network 15 by using the wireless LAN device 36, and exert control for disregarding the image pickup instruction signal, thus enabling a shift to the image pickup mode only in the charging mode or the standby mode in which the vacuum cleaner main body 11 is connected to the charging device 12.

In the above cases, the shifting to the image pickup mode is executed when an image pickup instruction signal is received via the external device 16. Alternatively, for example, the shifting to the image pickup mode may be done automatically by using a timer when a previously stored specified time has come or at every specified time elapse. In this case, the specified time or the specified time elapse may be set directly to the vacuum cleaner main body 11 (control unit 37) via unshown external input means (external input part) such as a remote control, a display part 34 such as a touch panel having a function of input operation means (input operation part), or the like, or may be remotely set from the external device 16. With this constitution, it is possible to automatically pick up images when a user desires periodic image pickup of an object.

The control functions in the above individual embodiments may be mounted all on one vacuum cleaner main body 11 so as to allow a user to use those functions at the user's selection and setting.

Furthermore, for example, when the vacuum cleaner main body 11 is stranded at a step gap or the like during travel so as to be in a state unable to travel (stuck) after shifting to the image pickup mode, the control unit 37 drives the driving wheels 23, 23 (motors 24, 24) for retreat or swinging of the vacuum cleaner main body 11 so as to escape the state unable to travel. However, when the state unable to travel cannot be escaped even by such driving, picking up still images of the current position by the camera 35 and transmitting those images externally as an example allows the user to confirm the position of the vacuum cleaner main body 11 with those still images. Even if the vacuum cleaner main body 11 has become in an inoperable state due to lack of the capacity of the secondary battery 39, when a user being out has returned home as an example, the vacuum cleaner main body 11 can be easily and securely found.

It is also possible that image data picked up by the camera 35 in the image pickup mode are stored in the memory without being transmitted externally so that the user can check those data when so desired.

Further, the camera 35 can be utilized not only in the image pickup mode but also in the cleaning mode. For example, in a state unable to travel due to a step gap or an obstacle on the cleaning-object surface, picking up images by the camera 35 allows the user to be informed of places where cleaning was impossible. Cases that are decided as states unable to travel by the main casing 20 (vacuum cleaner main body 11) are exemplified by such cases as detection of a floating-up (stranded) state of the main casing 20 by a step-gap sensor function of the sensor parts 31, no changes in outputs from the obstacle sensor (distance measuring sensor), or the like. Also, image pickup by the camera 35 may be executed after the control unit 37 has driven the driving wheels 23, 23 (motors 24, 24) from a state unable to travel for retreat or swinging so that the main casing 20 has recovered to a travelable state. Furthermore, when the vacuum cleaner main body 11 cannot enter a gap, picking up images by the camera 35 also allows the user to be informed of the place where cleaning was impossible. Such cases are exemplified by a case in which the sensor parts 31 of the main casing 20 are provided with a function of a contact sensor for detecting contact with an obstacle or the like and, regardless if no obstacle has been detected by the function of the obstacle sensor of the sensor parts 31, contact has been detected by the function of the contact sensor, for example. Like this, informing the user of places that are yet cleanable by the vacuum cleaner main body 11 allows the user to be improved in cleaning-consciousness.

Also in the above cases, the image pickup instruction signal is disregarded in the charging mode for charging the secondary battery 39. However, for example, on the condition that the sensor parts 31 are fed with electric power even in the charging mode so that the image pickup instruction signal is acceptable even in the charging mode, it is possible to normally monitor the aspect of the room R.

According to at least one of the above-described embodiments, the control unit 37 has the image pickup mode in which the main casing 20 is autonomously traveled to an image pickup position where no obstacles are detected within a certain distance (within a virtual circle C in FIG. 1A around the main casing 20 by the function of the obstacle sensor, which are distance measuring sensors of the sensor parts 31, so that still images in a plurality of directions are picked up at the image pickup position by the camera 35. Therefore, images over a wide range can be picked up by the camera 35 reliably without being interrupted by any obstacles. Thus, for example, indoor aspects, changes, and the like can effectively be captured. In addition, when an image pickup instruction signal is received at a specified image pickup position, image pickup is executed at the position. That is, the wording that the main casing 20 is autonomously traveled to a specified image pickup position in the image pickup mode includes a case in which the autonomous traveling distance of the main casing 20 is 0.

Also, when picked-up still images are wirelessly transmitted, the user is allowed to easily check those still images by using the external device 16. Therefore, in-home aspects can be grasped securely even during the user's absence.

Furthermore, on the condition that an image pickup instruction signal for the camera 35 can be outputted from the external device 16, the user himself/herself is enabled to issue the image pickup instruction. Thus, a current aspect of the room R or the like can be checked in real time at a desired timing.

By using a noncontact-type sensor such as an ultrasonic sensor used as the function of the obstacle sensor in the sensor parts 31, the vacuum cleaner main body 11 is prevented from excessively colliding with obstacles, and neither collision noise nor damage to the main casing 20 or an obstacle occurs, as compared with cases in which a contact-type sensor or the like is used.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

A method for controlling an autonomous traveling body, comprising two modes of: a traveling mode for making a main casing autonomously travel; and an image pickup mode for making the main casing autonomously travel to an image pickup position where no obstacles within a certain distance around the main casing are detected by a distance measuring sensor and where still images in a plurality of directions are picked up by a camera.

The method for controlling an autonomous traveling body as described above, wherein images around the main casing are picked up by the camera while the main casing is swung.

The invention claimed is:

1. An autonomous traveling body comprising:
   a main casing;
   a camera capable of picking up an image and provided in the main casing;
   a driving wheel for enabling the main casing to travel;
   a distance measuring sensor provided in the main casing to detect a distance to an obstacle around the main casing; and
   a control circuit having at least two modes of: a traveling mode in which the control circuit controls drive of the driving wheel so as to make the main casing autonomously travel while avoiding an obstacle to which a first distance detected by the distance measuring sensor is less than a preset specified distance;
   and an image pickup mode in which the control circuit makes the main casing autonomously travel to an image pickup position where no obstacles are detected within a certain distance in which a second distance detected by the distance measuring sensor is more than the preset specified distance and where still images in a plurality of directions are picked up by the camera.

2. The autonomous traveling body of claim 1, wherein the control circuit controls the drive of the driving wheel so as to be able to swing the main casing.

3. The autonomous traveling body of claim 1, wherein the control circuit determines the image pickup position where the second distance detected by the distance measuring sensor is more than the preset specified distance and no obstacles within a certain distance around the main casing is detected in the image pickup mode.

4. A method for controlling an autonomous traveling body, the method comprising two modes of:
   a traveling mode for making a main casing autonomously travel while avoiding an obstacle to which a first distance detected by a distance measuring sensor is less than a preset specified distance; and
   an image pickup mode for making the main casing autonomously travel to an image pickup position where no obstacles are detected within a certain distance in which a second distance detected by the distance measuring sensor is more than the preset specified distance and where still images in a plurality of directions are picked up by a camera.

5. The method of claim 4, wherein the image pickup position is positioned where the second distance detected by the distance measuring sensor is more than the preset specified distance and no obstacles within a certain distance around the main casing is detected in the image pickup mode.

* * * * *